J. B. WIARD.
DYNAMO ELECTRIC MACHINE.
APPLICATION FILED DEC. 6, 1905.

1,043,887.

Patented Nov. 12, 1912.

2 SHEETS—SHEET 1.

Witnesses:
Benjamin B. Hull
Helen Oxford

Inventor:
John B. Wiard.
by Albert G. Davis
Atty.

J. B. WIARD.
DYNAMO ELECTRIC MACHINE.
APPLICATION FILED DEC. 6, 1905.
1,043,887.
Patented Nov. 12, 1912.
2 SHEETS—SHEET 2.
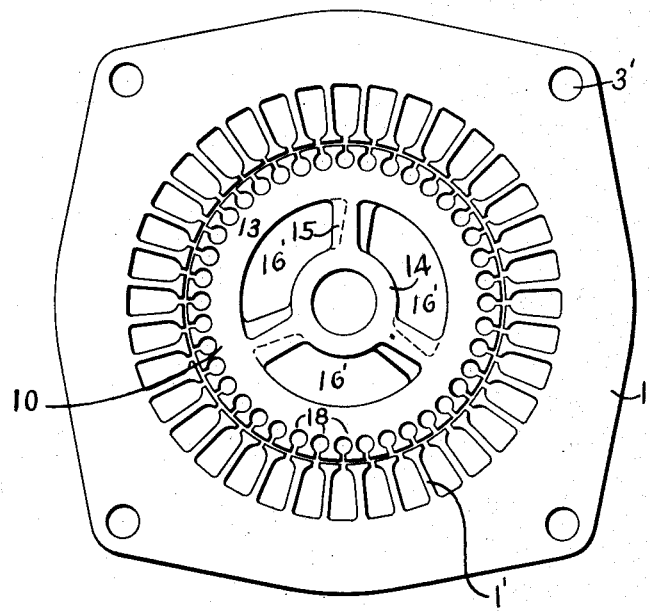
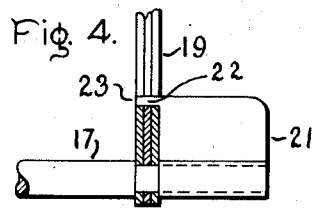
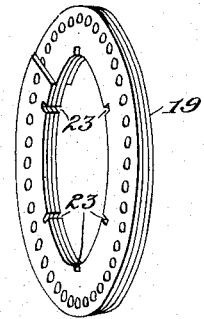
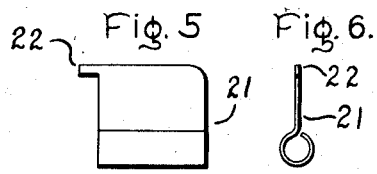
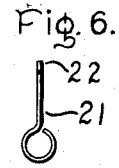
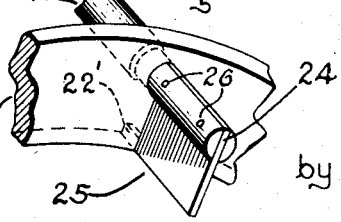
Witnesses:
Inventor:
John B. Wiard.
by Albert G. Davis
Att'y.

UNITED STATES PATENT OFFICE.

JOHN B. WIARD, OF LYNN, MASSACHUSETTS, ASSIGNOR TO GENERAL ELECTRIC COMPANY, A CORPORATION OF NEW YORK.

DYNAMO-ELECTRIC MACHINE.

1,043,887.　　　　Specification of Letters Patent.　　Patented Nov. 12, 1912.

Application filed December 6, 1905. Serial No. 290,559.

*To all whom it may concern:*

Be it known that I, JOHN B. WIARD, a citizen of the United States, residing at Lynn, county of Essex, State of Massachusetts, have invented certain new and useful Improvements in Dynamo-Electric Machines, of which the following is a specification.

My present invention relates to dynamo-electric machines and comprises certain features of construction and arrangement whereby a simple and efficient construction is obtained which has excellent electrical and mechanical properties, and which will rapidly dissipate the heat generated in it when in operation.

The various features of novelty which characterize my invention are pointed out with particularity in the claims annexed to and forming a part of this specification.

For a better understanding of my invention and the advantages obtained with it, reference may be had to the accompanying drawings and descriptive matter in which I have illustrated and described my invention as embodied in an induction motor, though certain features of my invention are equally suitable for use in other types of dynamo-electric machines.

Figure 1:
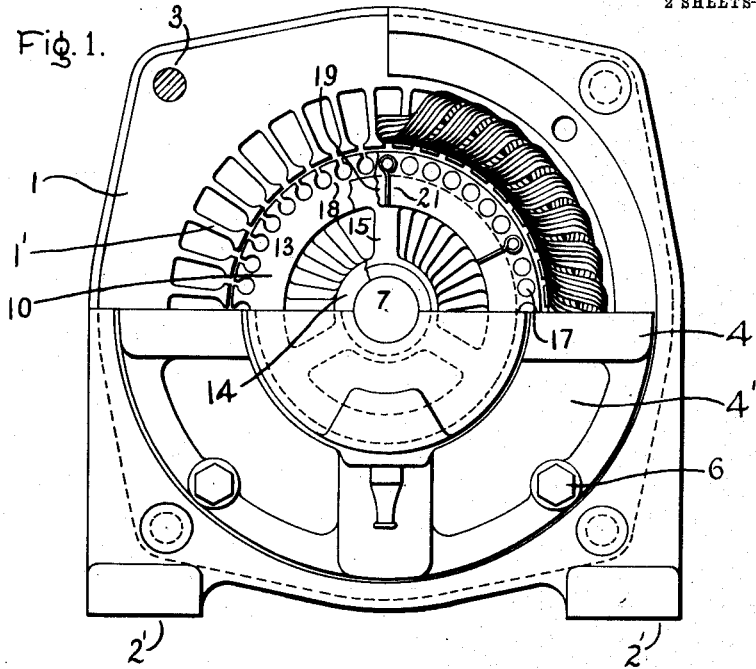
Figure 2:
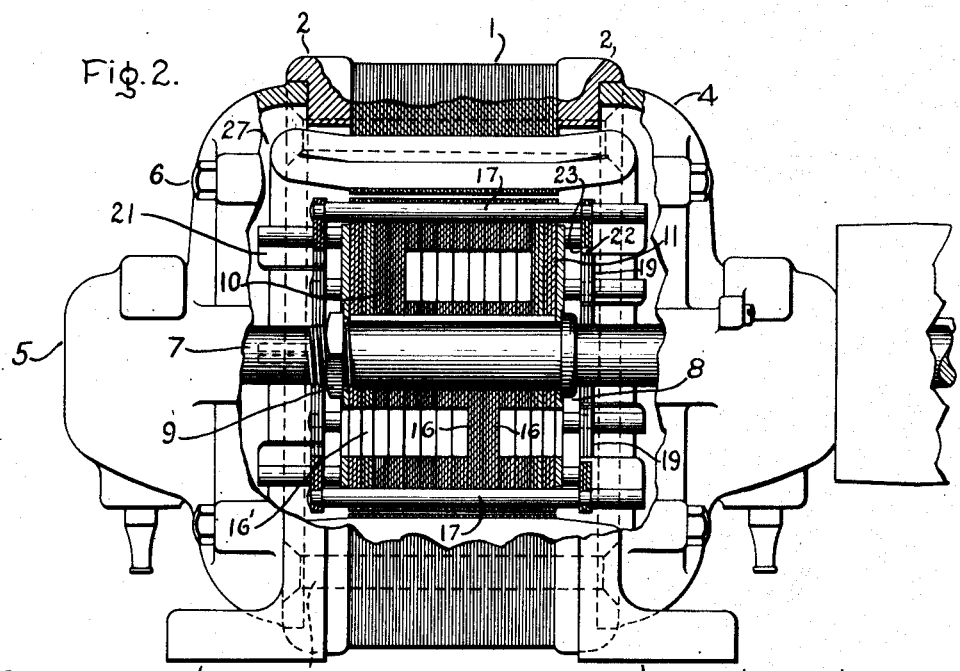

Of the drawings, Figure 1 is an end elevation with parts broken away of a multiphase induction motor; Fig. 2 is an elevation taken at right angles to Fig. 1 with parts broken away and in section; Fig. 3 is an elevation showing the configuration of the stator and rotor punchings and the manner of assembling the latter; Fig. 4 is a sectional elevation illustrating the manner of securing the ventilating vanes to the end of the rotor; Fig. 5 is a side elevation and Fig. 6 an end elevation of the vanes; Fig. 7 is a perspective view of an end ring before assembly; and Fig. 8 is a perspective view illustrating a modified main construction.

The core of the stationary member of the machine or stator is composed of punchings 1 secured by means of rivets 3 between end frame members 2 formed with supporting feet 2'. The ends of the rivets are upset in countersunk or counterbored recesses provided for the purpose in the end frame members. It will be observed that the rivets 3 are so located as to be practically without the path of the working flux in the stator core, thus avoiding eddy current losses in the rivets. In the particular construction illustrated in the drawings, the holes 3' in each punching 1 through which the rivets 3 pass are located in portions of the punchings lying without the largest circles which can be inscribed on the side of the punching, giving the magnetic circuit a uniform cross-section of unbroken magnetic material all the way around. By giving the stator punchings the configuration shown, which is substantially rectangular each side of the rectangle having straight line portions at a slight angle to each other and the sharp corners rounded, the outlines are made pleasing in appearance, the magnetic circuit is given a uniform cross-section of unbroken magnetic material and a rigid structure is produced. As the periphery of the core formed of the punchings 1 is entirely exposed the heat generated in the core is very rapidly dissipated. Bonnets 4, each provided with a bearing box formed with large apertures 4' and 5, are secured one against each frame member 2 by means of bolts 6 tapped into the latter.

In building the stator, the punchings 1 are assembled over an expansible arbor, the outer surface of which engages the inner ends of the core teeth 1'. After the punchings 1 are all assembled with the holes 3' in register the assembled punchings are compressed while still on the arbor in any suitable manner as by means of a hydraulic press. While the punchings are under compression, the end frame members 2 through which the pressure is ordinarily applied to the punchings are secured together by rivets 3. The surfaces of the end frame members against which the bonnets 4 engage are machined and the center lines for the holes into which the bolts 6 are tapped are formed while the core and end frame members are supported and centered by the arbor. By this procedure it will be understood that the various parts of the motor are lined up with respect to the inside surface of the stator core. As a result, the air gap between the cores of the rotating and stationary members may be reduced to a minimum, since only a very small allowance need be made for clearance. By compressing the core and securing the end frame members together in the manner described the quantity of laminated core material per unit of volume is made very large with a corresponding decrease in core loss, etc.

The shaft 7 of the rotating member or rotor of the machine is journaled in the boxes 5. Between the collar 8 and a nut 9 on the shaft 7 is clamped the rotor body which comprises laminæ 10 assembled between end member 11. In the particular form of my invention disclosed, the rotor core punchings 10, which are all similar, each comprise an annular portion 13, a hub portion 14, provided with an aperture through which passes the shaft 7, and connecting arm or spoke portions 15. The arm or spoke portions of the laminæ are displaced with reference to each other to form blades or vanes extending spirally about the axis of revolution of the rotor, whereby the rotation of the rotor in either direction will cause air to be moved axially through the rotor body.

The punchings are assembled in sections or bundles 16, as shown with the laminæ in each section directly superimposed, but each section from one end of the core to the other is given a slight angular displacement with respect to the preceding section. The angular displacement between two adjacent sections is shown clearly in Fig. 3. As a result of this manner of assembling the rotor core three spirally extending spaces or channels 16' are formed in the body of the rotor core through which air is forced when the rotor revolves. The laminæ composing each bundle or section may be riveted together, though with relatively small cores this is unnecessary.

The windings for the rotor of the construction described may consist of bars or rods of conducting material 17 passing through slots or passages 18 formed to receive them in the annular portions 13 of the rotor punchings. It will be understood that in ordinary cases the angular difference between adjacent sections 16 will correspond to the distance between centers of adjacent slots or passages 18 or a multiple thereof. The ends of the conducting rods or bars 17 shown reduced, pass through openings formed in end connecting members 19 which are preferably built up of a plurality of thicknesses of sheet metal in contact with each other, as shown in the figures of the drawing, so as to form a laminated end ring. I have obtained excellent results by forming these members 19 of one or more turns of a helix formed by winding a copper bar or strip edgewise about a suitable form, (see Fig. 7). The ends of most of the bars 17 are upset or riveted against the outer surface of the end members. The ends of some of the bars, however, are extended beyond one end member 19, and the ends of a number of other bars project some distance through the opposite end member. To these projecting ends are secured vanes 21. In the construction shown by Figs. 4, 5 and 6, each vane, which is preferably formed out of sheet metal of good heat conductivity, such as copper, has one edge curled or bent to form a socket in which is received the appropriate projecting end of a rod or bar 17. At the inner end of each vane is provided a portion 22 which extends parallel to the shaft 7 and enters a notch or groove 23 formed for the purpose at the inner edge of the corresponding end member. Preferably the vanes are rigidly secured in place by solder.

In the construction shown in Fig. 8 the ends of the conductors 17' extended beyond the end member 19 to support ventilating vanes are each formed with a slot 24 in which the appropriate vane or fan blade 25, which in this form is usually plane, is secured by rivets 26. The vanes 25 may be provided with projections 22' similar to the projections 22 and for a similar purpose.

The cooling of the rotor is especially effective since the relatively heavy conductors of copper or similar material give up much of their heat by conduction to the fan blades or vanes which of course very rapidly give up their heat to the air in contact with them. It will be readily understood that when the rotor revolves in either direction air will be moved through the rotor core on account of the arrangement of the arms of the core and that the fans 21 or 25 will set up an air circulation which will cool not only the end portions of the rotor winding, and of the bars 17 in direct contact therewith, but also the ends of the stator winding 27. By the arrangement described machines are produced in which the output for a unit of volume and weight may be made very high since the heat generated is rapidly dissipated from the rotor and the stator cores and also from their windings. The construction is easily and cheaply produced and possesses excellent mechanical as well as electrical properties.

While the various features of my invention are capable of advantageous conjoint use it will be readily understood that certain features of my invention may be used without a corresponding use of others, and that changes may be made in the form of my invention without departing from its spirit, and I do not wish the claims hereinafter made to be limited to the particular embodiment disclosed more than is made necessary by the state of the art.

What I claim as new, and desire to secure by Letters Patent of the United States, is,—

1. In the rotating member of a dynamo-electric machine, arm or spoke portions each formed of sections in the form of bundles of laminæ, successive sections being angularly displaced in the same direction.

2. In the rotating member of a dynamo-electric machine, arm or spoke portions each formed of laminated sections, said sections being displaced with respect to each other so that each arm or spoke portion forms a ventilating vane or blade for forcing air axially through said member.

3. In a dynamo-electric machine, a rotating core formed of bundles of laminæ, each bundle comprising an annular portion and arm or spoke portions, said annular portion having conductor receiving slots or passages formed in it, successive bundles being angularly displaced with respect to each other in the same direction, the displacement of adjacent bundles being equal to the distance between one or more slots or passages.

4. In a dynamo-electric machine, a rotating core body comprising bundles or sections of laminæ each formed with a substantially annular portion from which extend internally arm or spoke portions, successive bundles being angularly displaced with reference to each other in the same direction so that the spoke or arm portions form blades or vanes extending spirally about the axis of rotation.

5. In a dynamo-electric machine, a rotating core formed of punchings comprising an outer body portion and arm or spoke portions projecting inwardly therefrom, successive laminæ or bundles thereof from one end of the core to the other being angularly displaced in the same direction with respect to each other so that the arm or spoke form blades or vanes extending spirally about the axis of rotation of the core.

6. In a rotor of an induction motor, a core having conductor bars, short circuiting rings connecting said conductor bars, and fan blades on the ends of said conductor bars, said fan blades being outside of said rings.

7. In an induction motor, a rotor comprising a slotted core, conductor bars located in the slots of said core, short circuiting rings for said conductor bars and fan-blades mounted on the ends of said conductor bars, said fan blades being alternately disposed on opposite sides of the rotor and extending beyond the short circuiting rings.

8. In an induction motor, a rotor comprising a slotted core, conductor bars located in the slots of said core, and fan-blades on the ends of said bars, the blades being alternately disposed on opposite sides of the rotor.

9. As an article of manufacture, a conductor bar for induction motors having a fan-blade at one end thereof.

10. In combination, a rotating core having axially extending grooves or passages formed near its periphery, bars of conducting material located in said grooves or slots, end members of conducting material one at each end of the core formed with openings through which the ends of the bars pass, the ends of some of said bars projecting beyond the end members, and fan blades or vanes rigidly secured to said projecting ends.

11. In combination, a rotating core having axially extending grooves or passages formed near its periphery, bars of conducting material located in said grooves or slots, end members of conducting material one at each end of the core formed with openings through which the ends of the bars pass, the ends of some of said bars projecting beyond the end members, fan blades or vanes rigidly secured to said projecting ends, and means connecting the fan blades or vanes to said end members.

12. In combination, a rotating core having axially extending grooves or passages formed near its periphery, bars of conducting material located in said grooves or slots, end members of conducting material one at each end of the core formed with openings through which the ends of the bars pass, the ends of some of said bars projecting beyond the end members, fan blades or vanes connected to said projecting ends, and means connecting the fan blades or vanes to said end members, said means comprising a projection from the vane or blade which engages the end member.

13. In combination, a rotating core, grooves or passages formed near its periphery, bars of conducting material located in said grooves or passages, end members of conducting material one at each end of the core formed with openings through which the ends of the bars pass, the ends of some of said bars projecting beyond the end members, fan blades or vanes connected to said projecting ends, and means for connecting the fan blades or vanes to said end members, said means comprising a projection from each vane or blade which enters a notch formed to receive it in the appropriate end members.

14. In an induction motor, a rotating core, bar conductors carried by said core at or near its periphery, annular end members of conducting material located one at each end of the core, each of said end members being provided with openings through which all of said bars extend, the ends of some of said bars being upset to rigidly connect said bars and end members, one end of each of a number of other bars extending through one or the other of said end members, and ventilating fans or blades rigidly secured to said extending ends.

15. In a dynamo-electric machine, a rotating core formed with axially extending slots or passages adjacent its periphery, conducting bars or rods located in said slots, annular members of conducting material located one at each end of the core which said bars or rods engage, some of said bars or rods terminating at the end members while others are extended by one or the other of said end members, and fan blades or vanes secured to the ends of the bars extending beyond the end members.

16. In a dynamo-electric machine, a rotating core formed with axially extending passages near its periphery, bars of conducting material located in said passages, annular member of conducting material placed one at each end of said core to which said bars are electrically and mechanically connected, some of said bars terminating at the outer surface of the end members while the ends of other bars project beyond the end members, and vanes or blades secured to the conductor ends projecting beyond the end members and engaging the latter.

17. In a dynamo-electric machine, a rotating core composed of sections each in the form of a bundle of laminæ, each section having a ventilating aperture extending transversely through it, successive sections from one end of the core to the other being angularly displaced so that the apertures in the different sections unite to form a ventilating passage extending from one end of the core to the other spirally with respect to the axis of rotation of the core.

18. In a dynamo electric machine, a stationary member comprising punchings, the peripheries of which are exposed, end frame members between which the punchings are held, the said punchings having substantially rectangular outer peripheries and rivet holes in the corners, each side of the rectangle having two straight line portions at a slight angle to each other so as to give substantially the same width of magnetic material midway between the rivet holes as between the inner edge of the rivet holes and the inner periphery, and rivets extending through said holes and holding the punchings and end frame members together.

19. In a dynamo electric machine, a stationary member comprising punchings, the peripheries of which are exposed, end frame members between which the punchings are held, the said punchings having substantially rectangular outer peripheries and rivet holes in the corners, each side of the rectangle having two straight line portions at a slight angle to each other and joined by a curved portion so as to give substantially the same width of magnetic material midway between holes as between the inner edge of the rivet holes and the inner periphery.

20. In a dynamo electric machine, a stationary member comprising punchings, the peripheries of which are exposed, end frame members between which the punchings are held, each of said punchings having a nearly rectangular periphery and rivet holes in each corner of the rectangle, the width of the punchings at the corners being so calculated that the distance from the inner edge to the rivet hole to the inner periphery will be substantially the same as the width of the magnetic circuit midway between the rivet holes.

21. In a dynamo electric machine, a stationary member comprising punchings, the peripheries of which are exposed, end frame members, and rivets securing said end frame members and punchings together, the said punchings having substantially rectangular outer peripheries and rivet holes in the corners, each side of the rectangle having two straight line portions at a slight angle to each other and joined by a curved portion, so as to give substantially the same width of magnetic material midway between holes as between the inner edge of the rivet holes and the inner periphery, the ends of said rivets being countersunk in the end frame members and bonnets provided with bearings for the rotor shaft secured one against each end frame member.

22. In a dynamo electric machine, a rotor body, conductors carried thereby, and a member short-circuiting the ends of said conductors, said member comprising a strip of metal wound edgewise in the form of a helix.

23. In a dynamo electric machine, a rotor body, conductors carried thereby, and a member short-circuiting the ends of said conductors, said member comprising a plurality of turns of a metal strip wound edgewise in the form of a helix.

In witness whereof I have hereunto set my hand this first day of December, 1905.

JOHN B. WIARD.

Witnesses:
JOHN A. McMANUS, Jr.,
HENRY O. WESTENDARP.